United States Patent [19]

Franklin et al.

[11] Patent Number: 5,313,611
[45] Date of Patent: May 17, 1994

[54] METHOD AND APPARATUS FOR MAINTAINING A LOOKUP TABLE FOR STORING FUNCTION VALUES

[75] Inventors: James W. Franklin, Pepperell; Gary H. Newman, Concord, both of Mass.

[73] Assignee: Eastman Kodak Company, Rochester, N.Y.

[21] Appl. No.: 855,237

[22] Filed: Mar. 23, 1992

Related U.S. Application Data

[63] Continuation-in-part of Ser. No. 737,922, Jul. 29, 1991, Pat. No. 5,247,632, which is a continuation of Ser. No. 300,783, Jan. 23, 1989, abandoned.

[51] Int. Cl.$^5$ ............................................. G06F 12/02
[52] U.S. Cl. ..................... 395/425; 364/255.7; 364/246.3; 364/246; 364/DIG. 1
[58] Field of Search .............. 395/425, 400, 775, 100, 395/115; 367/11; 358/22, 12, 351, 350, 2, 6, 8, 35, 144, 239, 275, 233, 237, 256, 278, 751; 340/700, 701; 365/230.01

[56] References Cited

U.S. PATENT DOCUMENTS

| | | | |
|---|---|---|---|
| 3,911,403 | 10/1975 | O'Neill, Jr. .......................... | 364/200 |
| 4,375,671 | 3/1983 | Engle .................................. | 367/425 |
| 4,618,858 | 10/1986 | Belch .................................. | 340/724 |
| 5,075,845 | 12/1991 | Lai et al. ............................. | 395/425 |
| 5,097,427 | 3/1992 | Lathrop et al. ..................... | 395/130 |
| 5,170,476 | 12/1992 | Laakso et al. ...................... | 395/425 |

OTHER PUBLICATIONS

Levy et al., "Virtual Memory Management in the VAX/VMS Operating System", Mar., 1982, IEEE: Computer, 35–41.
Thakkar et al., "A High-Performance Memory Management Scheme", May 1986, IEEE: Computer, pp. 8–19.
Wada, "A Virtual Memory System for Picture Processing", May, 1984, vol. 27, No. 5, Communications of the ACM, pp. 444–454.
Trevett, "Interactive Processing of Large Images", Jan., 1989, Advanced Imaging, pp. 51–56.
Knuth, "The Art of Computer Programming", 1973, Chapter Six, vol. 3, Sorting and Searching, pp. 389–542.
McKellar et al., "Organizing Matrices and Matrix Operations for Paged Memory Systems", Communications of the ACM, vol. 12, No. 3 pp. 153–165 Mar., 1989.
Author Unknown, "Virtual Storage: Info State of the Art Report", 1976, Program Optimization, pp. 155–157, Infotech International, 1976.
McKeag, "Survey of Virtual Storage Techiques", 176, pp. 360–361.

Primary Examiner—Gopal C. Ray
Attorney, Agent, or Firm—Milton S. Sales

[57] ABSTRACT

A dynamic lookup table device and method for storing a plurality of function values, wherein each stored function value represents a value of a function evaluated at a selected domain point of the function's domain. The device generates an input address which identifies a domain point. In response to the input address, a memory device within the lookup table device provides a lookup table entry value. The memory device includes a plurality of storage locations for storing a plurality of lookup table values. It also includes a page table storage device for mapping each input address to a corresponding storage location. Each unallocated input address is mapped to at least one shared storage location containing a default lookup table value. Each allocated input address is mapped to a corresponding storage location allocated to the input address. If the lookup table entry provided by the memory device is the default value, the lookup table device determines the value of the function at the selected domain point. It then stores the function value in a storage location of the memory allocated to the input address. Toward this end, it first determines if the input address is allocated. If the input address is unallocated, a new storage location is allocated to the input address. The content of the page table storage device is then modified to map the input address to the new storage location.

22 Claims, 5 Drawing Sheets

|  | 133 | 134(N) | | 134(K) |
|---|---|---|---|---|
| 132(A) | NUMBER OF DIMENSIONS | $S_N$ | ....... | $S_K$ |
| 132(B) | | | ........ | |
| 132(M) | | | ........ | |

FIG. 6

|  | 140 | 141 |
|---|---|---|
| 137(A) | CONTROL INFORMATION | PHYSICAL PAGE NUMBER |
| 137(B) | | |
| 137(P) | | |

FIG. 7

METHOD AND APPARATUS FOR MAINTAINING A LOOKUP TABLE FOR STORING FUNCTION VALUES

This is a continuation-in-part of U.S. application Ser. No. 07/737,922, filed Jul. 29, 1991, U.S. Pat. No. 5,247,632 which is a continuation of U.S. application Ser. No. 07/300,783, filed Jan. 23, 1989, now abandoned.

FIELD OF THE INVENTION

The invention relates to a system for evaluating a function at a variety of points in the function's domain.

BACKGROUND OF THE INVENTION

The need to evaluate a function at a variety of points arises for example in color image processing. To process an image, each pixel of the image is mapped from its present color value to a new color value determined by a function which defines the desired image transformation. For example, to transform the pixel value R, G, B, a first function $F_R(R, G, B)$ is evaluated at the point in the color space defined by the coordinates R, G, B to form a transformed value for the red color component $R_T = F_R(R, G, B)$. Similarly, the function $F_G(R, G, B)$ is computed to derive the green color component $G_T = F_G(R, G, B)$; and the function $F_B(R, G, B)$ is computed to derive the blue color component $B_T$.

In a typical image, many pixels have the same color value. For example, an image having two million pixels may include only several hundred thousand unique color values. Accordingly, if each pixel of the image is independently processed, several million redundant evaluations of each function may be performed.

Caching schemes have been used for storing precomputed values of a function for later reuse. One type of caching scheme saves the precomputed function value for every unique input value in the function's domain. A second type stores only the precomputed function values for selected input values.

Caching schemes of the first type are typically used for functions that have a small number of unique input values. In this case, the size of the data area needed to store the computed results for each possible input value is reasonably small.

Caching schemes of the second type are typically used for functions that have a large number of unique input values. For these functions, an extremely large data area is required to store precomputed values for every point in the function's domain. To reduce the storage requirements, the cache saves only precomputed function values for selected input values which are most likely to be required.

Various methods have been used to select which precomputed values to save. A simple method saves only the function values for the most recently processed input values. Another method saves only the most frequently processed input values.

Neither of the above described caching schemes are useful when applied to functions which require little time to compute but which have extremely large domains. First, the time $f_T$ required to compute the result of the function for a single input value is very small. Accordingly, for the cache to be effective, the time to fetch the precomputed value from the cache must be extremely small. Otherwise, it is faster to simply recompute the function.

Second, since the potential number of unique input values for the functions is very large, an extremely large data area is required to store a precomputed function value for each possible input value. The size of the data area can be reduced through the use of dynamic memory allocation, complex data structures, or by selection algorithms which save the function values for selected input values. However, these procedures require substantial time to dynamically allocate memory, traverse linked lists, search trees, and/or search hash tables. Further, they require significant time to select which computed function values to save.

Therefore, one object of the present invention is to store a function value only after it has been requested and computed in the course of performing a given transformation. Another object is to quickly determine which function values have already been computed and, upon the occurrence of a redundant input value, retrieve the previously computed value from storage. Yet another object is to achieve these ends without using substantial portions of computer memory and without requiring substantial processing resources for storing and retrieving function values.

SUMMARY OF THE INVENTION

The invention relates generally to a dynamic lookup table apparatus for storing a plurality of function values, each stored function value representing a value of a function evaluated at a selected input point of the function's domain.

The lookup table device generates an input address which identifies a selected domain point. In response to the input address, a memory device within the lookup table provides a lookup table entry value.

The memory device includes a plurality of storage locations for storing a plurality of lookup table values. It also includes a page table storage device for mapping each input address to a corresponding storage location. Each unallocated input address is mapped to at least one shared storage location containing a default lookup table value. Each allocated input address is mapped to a corresponding storage location. If the lookup table entry provided by the memory device is the default value, the lookup table determines the value of the function at the selected domain point. It then stores the function value in a storage location of the memory allocated to the input address Toward that end, the device determines whether the input address is allocated. If the input address is unallocated, a new storage location is allocated to the input address The contents of the page table storage device are then modified to map the input address to the newly allocated storage location.

Each allocated input address is either "known" or "unknown". For each known allocated input address, the corresponding storage location contains a function value for the input point identified by the known allocated input address. For each unknown allocated input address, the storage location contains the default lookup table value.

The page table storage device includes a page pointer storage location for storing a page pointer for a corresponding page of input addresses. For each page of unallocated input addresses, the page pointer is a default pointer which identifies the at least one shared storage location. For each page of allocated input addresses, the page pointer identifies a corresponding set of allocated storage locations which include a storage location allocated to each the input address within the page. Thus, to remap a page of input addresses, the device replaces a default page pointer with a new page pointer having a physical page number identifying a set of newly allocated storage locations.

The dynamic lookup table further initializes each storage location of the set of newly allocated storage locations to the default value. More specifically, each page pointer storage location includes a page number storage portion for storing a page number identifying a set of storage locations and an attribute storage portion for storing an attribute identifier which specifies the access attributes of the storage locations identified by the page number. The device initializes the attribute identifier of each default page pointer to specify a copy-on-write attribute. It also initializes the attribute identifier of each other page pointer to specify a read/write attribute. Upon an attempt to store a function value in a storage location pointed to by said default pointer, the device generates a page fault interrupt signal. In response to the page fault interrupt signal, the device copies the contents of a shared storage location to each storage location within the set of newly allocated storage locations.

In another embodiment, each input address includes a sequence of dimensional pointers which identify an input point in a multidimensional domain. In such embodiments, the device includes an address translator for translating the input address into a memory address. The address translator derives from a higher order portion of each dimensional pointer, a first pointer which identifies a multidimensional sub-array of domain points which includes the received input point. It further derives from a lower portion of each dimensional pointer, a second pointer which identifies the input point in the multidimensional sub-array of points.

Toward that end, the address translator includes a swapper for concatenating the higher order portions of each dimensional pointer to form the first pointer and for concatenating the lower portions of each dimensional pointer to form the second pointer.

The address translator also includes a dimensionality map for generating dimensionality indicia defining demarcations, within an input address, between the respective dimensional pointers. The address translator uses the dimensionality indicia to identify the dimensional pointers within the input address.

The dimensionality map includes a plurality of entries, each including dimensionality information for a function lookup table. The address translator includes a pointer store which receives a pointer which identifies an entry corresponding to a selected function table. The dimensionality map uses the dimensionality information in the selected entry identified by the pointer to generate the dimensionality indicia.

Other objects, features and advantages of the invention are apparent from the following description of particular preferred embodiments taken together with the drawings.

BRIEF DESCRIPTION OF THE DRAWING

FIG. 6 is a diagram of the contents of a dimensionality map.

FIG. 7 is a diagram of the contents of a page table.

DETAILED DESCRIPTION OF AN ILLUSTRATED EMBODIMENT

Figure 1:
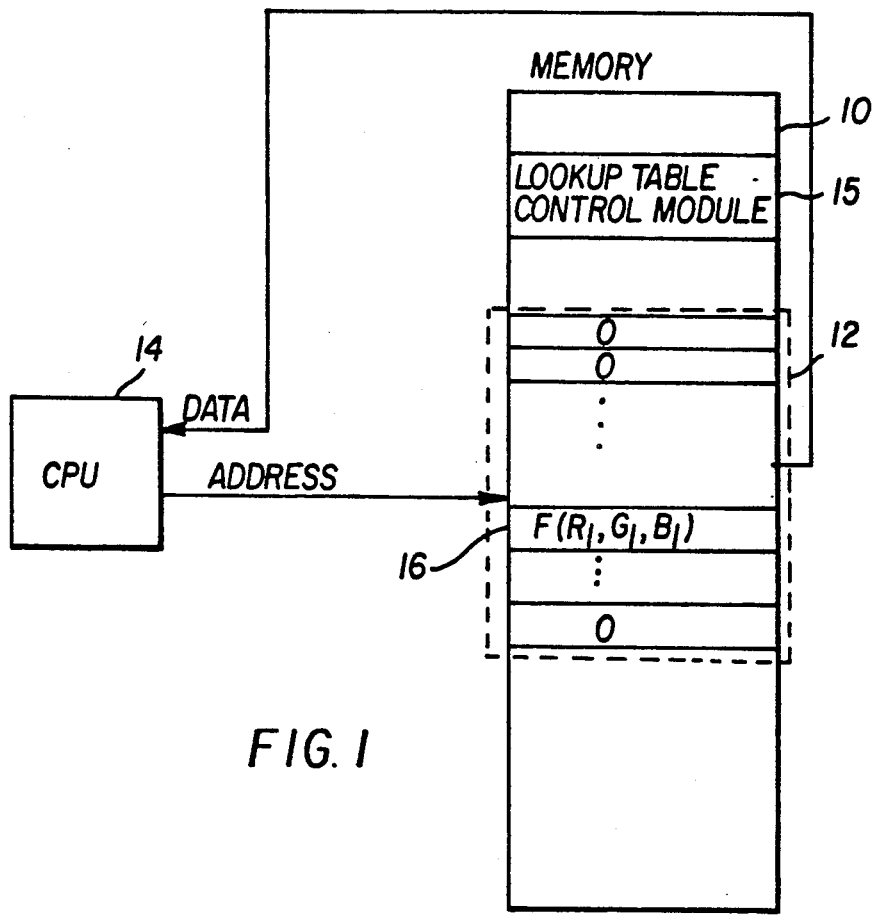
FIG. 1 is a block diagram of a function lookup table.

Referring to FIG. 1, a system for evaluating a function includes a memory 10 for storing a lookup table 12. The lookup table includes an entry for each point in the function's domain. Each entry is initially set to a default value, e.g., zero, to indicate that the value of the function at the corresponding point in the domain is not known.

The system further includes a processor unit (CPU) 14 for executing a lookup table control module 15 stored in memory 14. To evaluate the function at an input point R, G, B, in the domain, the control module 15 first instructs CPU 14 to read from the lookup table the entry 16 by asserting an input address corresponding to the input point R, G, B. If the entry 16 is equal to zero, module 15 recognizes that the value of the function at point R, G, B is unknown Accordingly, it proceeds to instruct CPU 14 to evaluate the function at that point and store the computed value f(R,G,B) within entry 16 of memory for future use.

In the preferred embodiment, the default value is set equal to zero. In processing common input color values, a typical color transform function evaluates to zero relatively infrequently. However, when the function does evaluate to zero, the control module stores zero in the lookup table. Upon the next occurrence of the input color value, the control module reads zero from the table, falsely assumes that the function has not yet been evaluated for the input color value, and again evaluates the function. To avoid such redundant calculations, the default value should be chosen to equal a value which is unlikely to occur during normal processing. In color image processing, the value zero is unlikely to occur and therefore is the preferred default value. However, for color transform functions which will likely evaluate to zero, a less common color value should be chosen as the default value.

Figure 4:
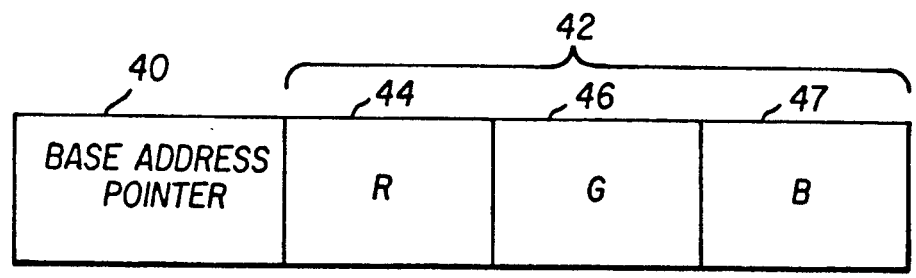
FIG. 4 is a diagram of the fields of an input address.

To eliminate the need to search the lookup table for an entry corresponding to a given point $R_1, G_1, B_1$, the coordinates $R_1, G_1, B_1$ of the point are used as an index into the table. More specifically, to access the lookup entry corresponding to the point $R_1, G_1, B_1$, module 15 instructs CPU 14 to assert a lookup table address in the form shown in FIG. 4. The lookup table address includes a base address pointer field 40 for identifying the location of the lookup table in memory. It also includes an index field 42 having three subfields 44, 46, 48, each subfield containing one of the coordinates of the desired point.

If the domain of the function is extremely large, a lookup table containing an entry for each point in the domain is prohibitively large. For example, in color image processing, a function $f_B(R, G, B)$ is a function which defines, for each color value defined by the coordinates R, G, B, a new blue color component $B_T = f_B(R, G, B)$. Each of the coordinates R, G, B, can range in value from zero to two-hundred and fifty-five. These coordinates therefore identify 16.7 million unique color values, i.e., $256 \times 256 \times 256$ color values. Accordingly, a lookup table containing an entry for each color value would require 16.7 million locations in memory.

Figure 2A:
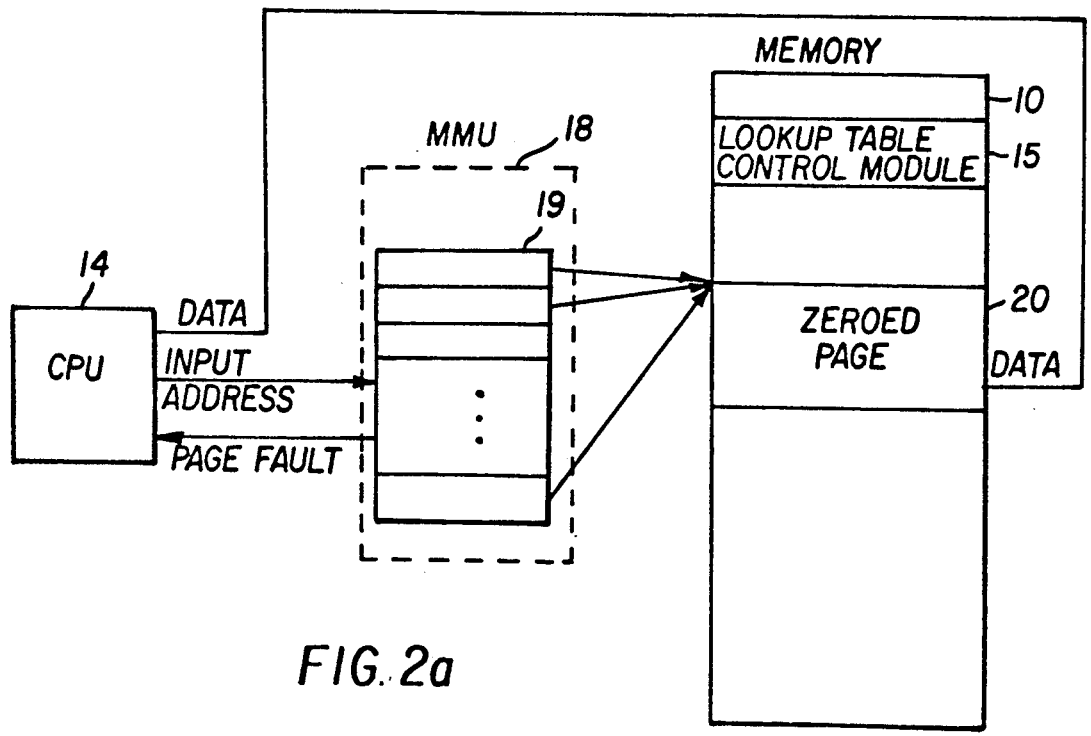
FIGS. 2(a) and 2(b), each is a block diagram of a function lookup table which includes a memory management unit.
Figure 2B:
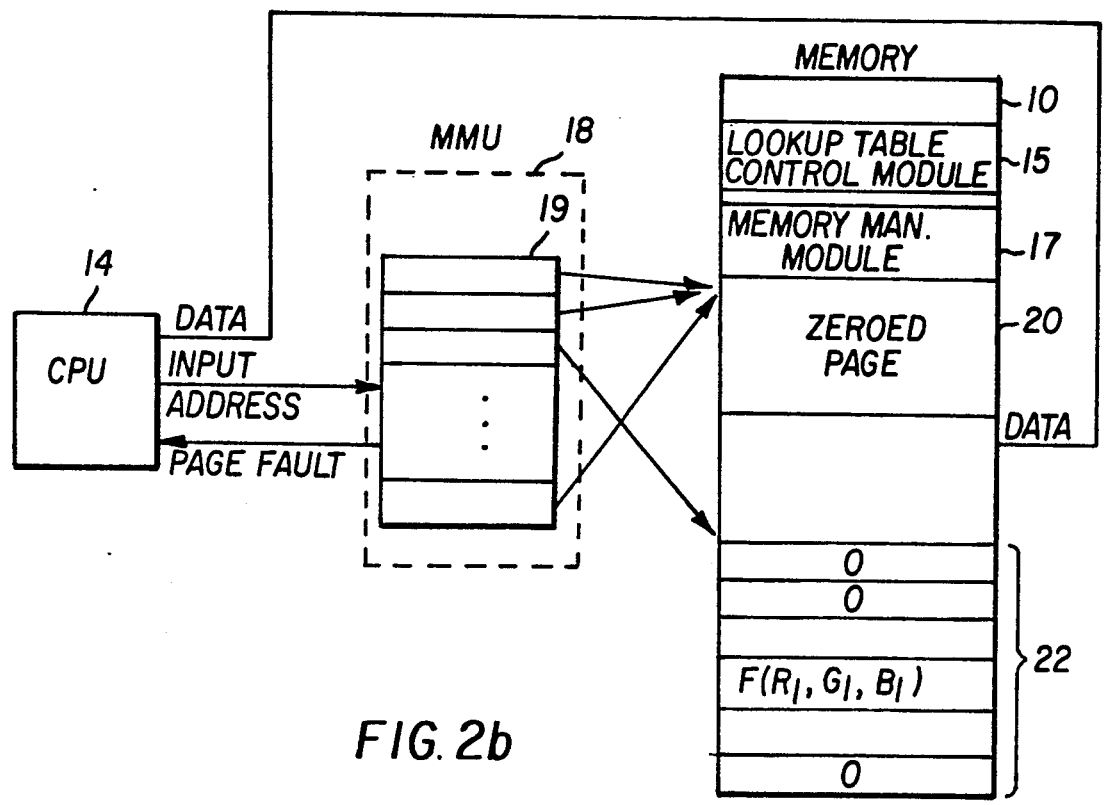

Referring to FIGS. 2(a) and 2(b), the present invention reduces the number of memory locations required for storing the lookup table by employing a memory management unit 18 connected between CPU 14 and memory 10. MMU 18 divides the 16.7 megabyte input address space into 4,096 pages, each page containing 4,096 consecutive input addresses. Toward this end, MMU 18 includes a page table storage device 19 for storing a plurality of page pointers. For each page of the input address space, page table 19 includes a page pointer which maps the page of input addresses to a corresponding page of physical addresses which identify a physical page of storage locations in memory 10. Initially, the MMU maps all 4,096 pages of the input address space to a single shared physical page 20 in memory 10 which is initialized to zero. Thus, the entire 16.7 megabyte lookup table at least initially requires only one page of memory. Each page pointer also indicates the read/write attributes of the page. For example, all input pages which are mapped to the zero page are write protected. They are also accorded "copy on write" status explained more fully below.

When CPU 14 first asserts an input address directed to an entry in the lookup table, MMU 18 fetches a location within the zeroed page. Upon receipt of the value zero, the control module 15 concludes that the value of the function at the corresponding input point is unknown. Accordingly, it instructs CPU 14 to calculate the value of the function at that point and to store the calculated function value back into the lookup table. However, since all pages which are mapped to the zero page of memory are write protected, the MMU 18 issues a page fault interrupt when CPU 14 attempts to write the calculated function value $f_B(R, G, B)$.

Referring to FIG. 2(b), the system further includes a memory management software module 17 stored in memory 10 which is invoked in response to the page fault interrupt. In response to a page fault interrupt, module 17 allocates a new page 22 within memory 10 for storing this function value. Toward this end, it instructs CPU 14 to replace the page table entry for the input page, which initially contained a pointer to the zero page, with a new pointer which identifies a newly allocated page 22. Further, the new pointer changes the attributes of the input page from "copy-on-write" status to a read/write status which allows the CPU to both read from and write to any input address in the page. The module also initializes each location of the newly allocated page to zero.

Once the page is remapped, the system reexecutes the aborted write cycle thereby allowing CPU 14 to write the function value $f_B(R, G, B)$ to the desired location within the newly allocated page 22. All other locations in the new page remain zero thereby indicating to the control module 15 that the function value at each corresponding input point is unknown.

In this manner, the lookup table requires only a minimum number of physical pages within memory 10. All unallocated pages of the lookup table are mapped to a shared zeroed page 20 of physical memory. Additional pages of physical memory are allocated for storage of computed function values as needed.

For some applications, the number of pages is sufficiently large that the physical memory available for storing the lookup table becomes full. For example, processing a color image requires computing a function $F_R(R,G,B)$ for each color value R,G,B in the image. In the example described above, the domain of possible color values includes 16.7 million unique color values. While most images include only a relatively small number of these color values, certain images may include a number of color values which exceeds the number of available storage locations in physical memory.

As the system processes such images, the memory management software module 17 must remove an existing page of physical memory to make room for a new page of the lookup table. Module 17 selects a page of the lookup table which has not been recently used. To remove the selected page, it remaps the selected page back to the zeroed page of physical memory by changing the selected page's page table entry. It then reinitializes the freed physical page of memory to zero to prepare it for use as the new page of the lookup table.

Thus, the page selected for removal is effectively discarded. Accordingly, if a color value within the discarded page re-occurs, the page must be reallocated and the function values recomputed. In typical color imaging applications, the time spent re-calculating the function for the discarded values is much smaller than the time required to temporarily copy the discarded page to disk and later retrieve it from the disk when needed, as in a conventional virtual memory system. Accordingly, module 17 simply discards the selected page as described above. However, in other applications, the time spent re-calculating the function is sufficiently large to justify copying the selected page to disk for later retrieval using conventional virtual memory paging techniques.

In the preferred embodiment, the lookup table is implemented by a computer having a virtual memory architecture used by Sun Microsystems Incorporated of Mountain View, Calif. ("Sun"). Sun's virtual memory system includes a Unix TM operating system. Three features of Sun's operating system make it particularly well suited for implementing the lookup table described above. First, the operating system provides an MMAP call for (a) establishing mappings from an input address space to a portion of physical memory associated with an object, and (b) assigning certain attributes to the page. Secondly, the system provides a particular type of page attribute referred to as "MAP_Private". For pages of the MAP_Private type, an attempt to modify a location within the page causes the operating system to copy the page and enter the modification into a corresponding location within the copied page. Finally, the system provides a predefined object, "/dev/zero", which is a file containing all zeros.

Using the above three features, a lookup table according to the present invention may be readily implemented. A lookup table is created by using the MMAP call to map all input pages of a desired lookup table to the object /dev/zero. In response to this call, the operating system loads a page table to map all assigned input addresses of the lookup table to the zeroed page. In loading the page table, the operating system also sets the MAP_Private attribute in each page table entry.

When the lookup table control module first reads an entry in lookup table initialized by the MMAP call, it receives the value zero. When the lookup table control module attempts to write a function value back into the table at the same location, the system automatically copies the zeroed page (since the zeroed page is assigned the MAP_Private attribute) and enters the function value into the copied page.

Figure 3:
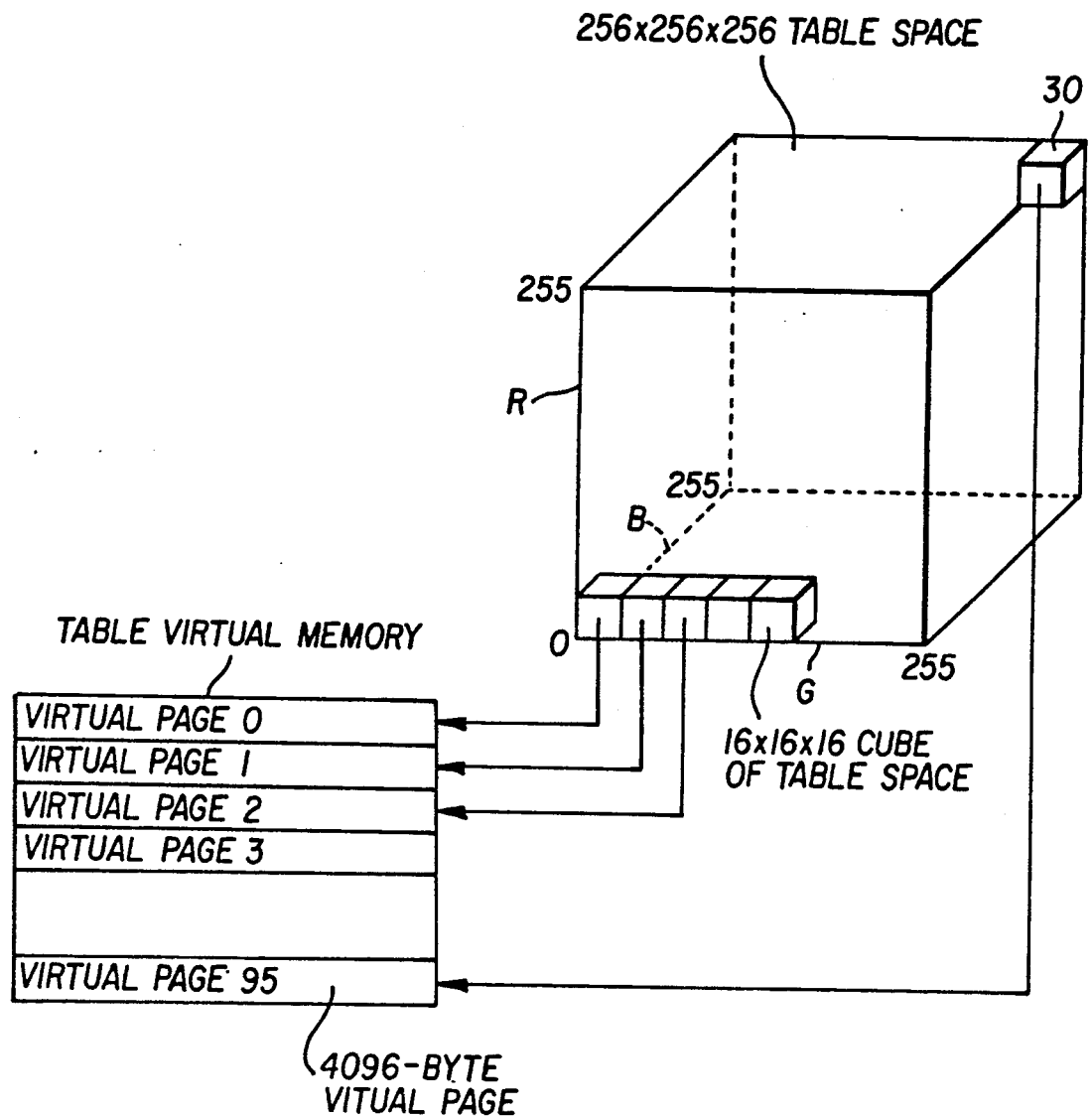
FIG. 3 is an illustration of a plurality of sub-arrays within a multidimensional domain and a plurality of corresponding pages of memory.

For a function having a multidimensional domain, MMU 18 arranges the entries within each page of the function's lookup table to reduce the number of physical pages which must be allocated. For example, referring to FIG. 3, the domain of the function $f_B(R, G, B)$ is a three-dimensional space in which each color value R, G, B corresponds to a single point in the color space. Typically, if a given color value $R_1$, $G_1$, $B_1$ is contained in an image being processed, color values near $R_1$, $G_1$, $B_1$ in the color space are also likely to be included in the image. For example, if part of the image depicts a blue sky, the image likely has many shades of blue. Accordingly, MMU 18 divides the color space into three-dimensional sub-arrays 30, wherein each sub-array is the same size as a page of memory. It then associates each sub-array 30 with a corresponding page of the memory 10 as shown in FIG. 3. For example, in the embodiment shown, each sub-array is a $16 \times 16 \times 16$ array of points of the color space and each associated page includes 4,096 consecutive memory locations.

The input addresses typically associated with each point in a given sub-array 30 are not consecutive. Accordingly, they cannot be used directly to address a page of consecutive locations in memory 10. As explained more fully below, MMU 18 therefore rearranges the dimensional pointers 44, 46, 48 of the index field of each input address (FIG. 4) to form a physical address such that, for all points within a given sub-array 30, the corresponding physical addresses are consecutive.

The following describes MMU 18 in greater detail for a lookup table used for storing sample values of a function having a multidimensional domain having N dimensions.

Figure 5:
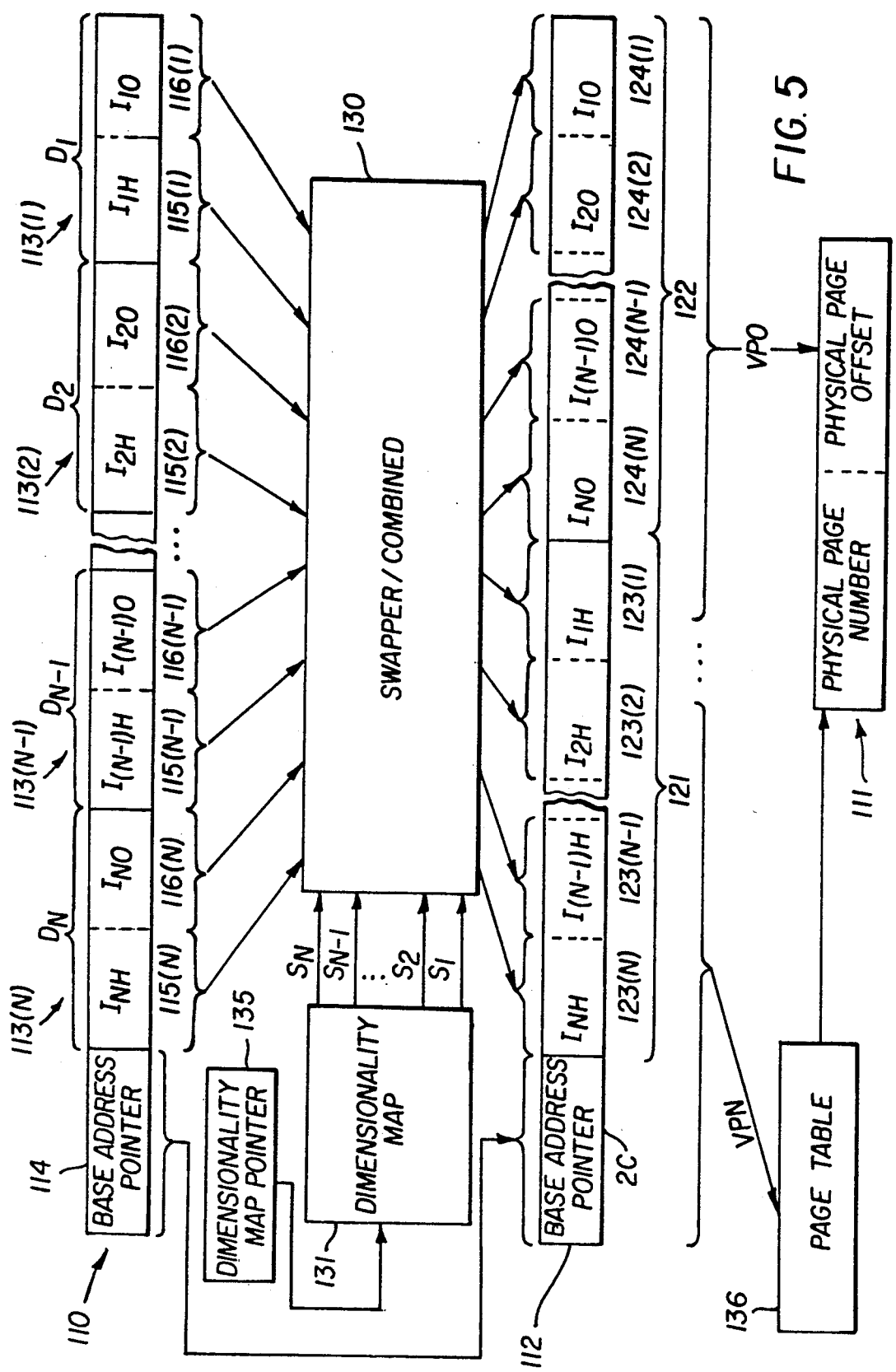
FIG. 5 is a diagram of a swapper for rearranging the fields of an input address to form a memory address.

Referring to FIG. 5, MMU 18 provides a two-step translation process to translate an input address 110 of a point in a multidimensional domain into a physical address 111 for use in addressing physical memory 10. In the arrangement, in the first translation step, the input address 110 is translated into an array virtual address 112, and, in the second translation step, the array virtual address is translated into the physical address 111.

In accordance with the invention, a multidimensional domain, which has N dimensions (where "N" is an integer), is divided into a plurality of equally-sized sub-arrays each also having N dimensions. Each point in the function's domain is identified by a input address 110 which includes a number of fields. In particular, the input address 110 includes a plurality of displacement fields 113(1) through 113(N) each of which contains the displacement, $D_k$ ("k" being an integer between 1 and N), of the point in the domain along each dimension. Each displacement field 113(k) further includes two fields, namely, a sub-array identification field 115(k), comprising the high-order portion $I_{kH}$ of the displacement field 113(k), and a sub-array offset field 116(k), comprising the low-order portion $I_{kO}$ of the displacement field 113(k). The sub-array identification field 115(k) identifies the displacement, in terms of the number of sub-arrays, along the particular dimension "k" to the sub-array which contains the point in the domain, and each sub-array offset field 116(k) identifies the displacement, in terms of the number of domain points, also along the particular dimension "k" within the sub-array, to the point identified by the input address 110.

In addition, the input address 110 further includes a base pointer field 114 the contents of which assist in locating the base, in the array virtual address space, of the lookup table containing the lookup table entry corresponding to the domain point addressed by the input address. More particularly, if the contents of all of the displacement fields of the input address 110 are zero, the input address 110 points to the location in the array virtual address space of the base of the lookup table. The entire array virtual input address 112, accordingly, includes a base pointer in field 114, which points to the base address of the lookup table, that is, the location of the first entry in the table, and displacements along each dimension, with each displacement including a high-order portion that identifies the sub-array containing the item and a low-order portion that identifies the displacement in the sub-array to the particular data item being identified by the input address.

During the first virtual address translation step in the memory management arrangement, the input address 110 is translated into an array address 112. The array address 112 includes three major fields, including an array base address pointer field 120, a sub-array pointer field 121 and a sub-array offset field 122. The array base address pointer field contains the array base address pointer copied from field 114 of the input address 110. The sub-array pointer field 121 contains a pointer value which identifies the sub-array in the multidimensional domain which contains the domain point identified by the input address 110. Finally, the sub-array offset field 122 contains an offset value which identifies the domain point within the sub-array.

More particularly, the sub-array pointer field 121 in the array address 112 includes a plurality of sub-array identification fields 123(k) ("k" being an integer from 1 to N) each of which contains a value corresponding to the high-order portion $I_{kH}$ taken from the corresponding sub-array identification field 115(k) in the input address 110. The collection of sub-array identification fields 123(k) comprising the sub-array pointer field 121 thus points to the sub-array containing the domain point identified by input address 110. Similarly, the sub-array offset field 122 includes a plurality of offset fields 124(k) each of which contains a value corresponding to the low-order portion $I_{kO}$ taken from the corresponding sub-array offset field 116(k) in the input address 110. The collection of offset fields 124(k) thus points to the domain point, in the sub-array pointed to by sub-array pointer field 121, identified by the input address 110.

The array virtual address 112 is formed by a swapper/combiner 130 under control of a dimensionality map 131, which is, in turn, under the control of a dimensionality map pointer 135 supplied with the input address 110. The swapper/combiner 130 receives the contents of all of the displacement fields 113(k) and, under control of dimensionality information $S_k$, re-orders the contents of the various displacement fields 113(k) to produce the sub-array pointer field 121 and sub-array offset field 122 in the array address 112. The dimensionality map 131 uses the dimensionality map pointer 135 to select dimensionality information $S_k$ that identifies the size along the corresponding "k-th" dimension of the multidimensional array, and, thus, identifies the size of the corresponding displacement field 113(k) in the input address 110. In addition, the dimensionality information $S_k$ identifies the size along the corresponding "k-th" dimension of each sub-array, and thus identifies the size of the corresponding sub-array offset field 116(k).

The dimensionality map pointer 135 is used to identify the lookup table which contains the domain point addressed by the input address 110 among a plurality of lookup tables which may be stored in the system. In one embodiment, the dimensionality map pointer 135 corresponds to the high-order portion of the input address, including the base address pointer 114 and at least a portion of the high-order portion $I_{NH}$ of the sub-array identification field 115(N).

The swapper/combiner 130 uses the dimensionality information $S_k$ for the "k-th" dimension to identify the points of separation in the input address 110 between the displacement fields 113(k). It also uses the dimensionality information to identify the points of separation between the sub-array identification fields 115(k) and sub-array offset fields 116(k) in each of the displacement fields 113(k). After identifying the sub-array identification fields 115(k) and the sub-array offset fields 116(k) in the input address 110, the swapper/combiner 130 can generate a re-alignment of the contents of the fields 115(k) and 116(k) to produce values for the sub-array pointer field 121 and sub-array offset field 122 of the array address 112. To complete the array address 112, the contents of the base pointer field 114 in the input address 110 are copied into the corresponding field 120 of the array address 112.

Figures 6, 7:
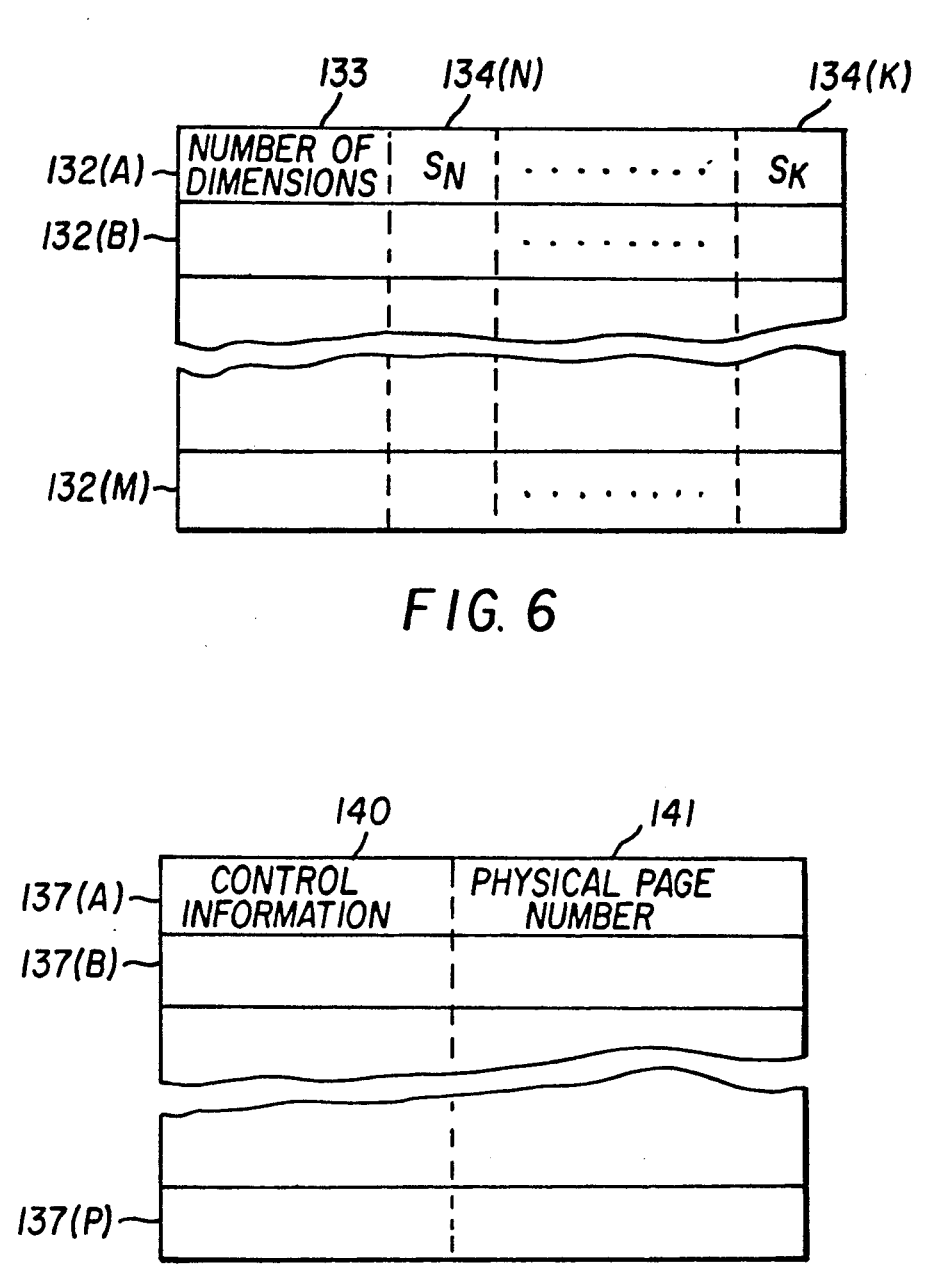

The structure of one embodiment of the dimensionality map 131 is depicted in detail in FIG. 6. With reference to FIG. 6, the dimensionality map 131 includes one or more entries 132(A) through 132(M) (generally identified by reference numeral 132) which are identified by the various values of the dimensionality map pointer 135. Each entry includes a plurality of fields, including a dimensionality number field 133 that identifies the number of dimensions in the function's multidimensional domain, and dimensionality information fields 134(1) through 134(N), with each field 134(k) containing the dimensionality information $S_k$ associated with the "k-th" dimension of the domain. It will be appreciated that, since different functions may have domains with different numbers of dimensions, the entries 132 may have different numbers of dimensionality information fields 134(k) in the dimensionality map 131.

It will be appreciated that, in a particular embodiment, the dimensionality map 131 may be provided to accommodate a predetermined maximum number of dimensions. In that case, the dimensionality map 131 need not have a field 133 identifying the number of dimensions. Instead, the dimensionality map may have entries 132 with a fixed number of dimensionality information field 134(k), corresponding to the predetermined maximum number of dimensions, and if a particular function's domain has fewer dimensions, the entry 132 therefor will have non-zero values only in fields 134 corresponding to the number of dimensions in the particular array.

With reference again to FIG. 5, the particular entry 132 in the dimensionality map to be used in connection with a particular function's domain is identified by a dimensionality map pointer 135, which is provided along with the input address 110. Alternatively, the dimensionality map 131 may include, in each entry 132, a field (not shown) which contains a value corresponding to the base address pointer for the array, and an associative search may then be performed to select the proper entry 132 in the dimensionality map 131 for use in translating the input address 110.

As noted above, the dimensionality map 131 provides dimensionality information $S_k$ identifying the size along the corresponding "k-th" dimension of each sub-array within the function's domain. It will be appreciated that, if the sizes, along the various dimensions, of sub-arrays do not vary as among the domains of the functions that may be implemented by the computer system (not shown), the swapper/combiner can determine the points of separation between the sub-array identification fields 115(k) and sub-array offset fields 116(k) in each of the displacement fields 113(k) without requiring information from the dimensionality map 131.

After the array address 112 has been generated, the second step in the translation process is performed, in which the array address 112 is translated into the physical address 111. In that operation, the array address 112 is divided into two portions; a high-order portion is used as a virtual page number VPN, and a low order portion is used as a virtual page offset VPO. The virtual page number VPN identifies the virtual page in the array virtual address space and the virtual page offset VPO identifies the offset into the virtual page containing the domain point identified by the input address 110.

It will be appreciated that the size of the portion of the array address 112 comprising the virtual page offset may be determined by the size of a page in the particular digital data processing system in which the invention is embodied, and, thus, need have no particular relation to the points of demarcation between the fields 121 and 122 or the various fields 123(k) and 124(k) of the array virtual address 112. However, in one embodiment, the virtual page offset corresponds to the sub-array offset field 122 of the array virtual address 112.

During the second translation step, the virtual page number is used as an index into a page table 136, which is used to translate all array virtual addresses for the process into physical addresses for accessing entries in the lookup table. The page table 136, which is shown in detail in FIG. 7, includes a number of entries 137(A) through 137(P) (generally identified by reference numeral 137), each of which includes a control information field 140 and a physical page number field 141. The control information field 140 includes such information as whether the entry 137 can be used, how the page can be accessed, that is, whether the page is write protected.

The physical page number field 141 of each entry 137 in the page table 136 contains a pointer which identifies the page in the physical memory corresponding to the sub-array of the domain which includes the domain point identified by the input address 110. The contents of the physical page number field 141 are used as the high-order portion of the physical address 110. The virtual page offset VPO from the input address is used as the low-order portion of the physical address 110, and effectively identifies the offset into the physical page of the item of data identified in the input address 110. To provide the physical address 111, the virtual page offset VPO is concatenated onto the physical page number from the field 141 of the entry 137 of the page table 136 identified by the virtual page number VPN of the input address. The physical address may then be used in accessing the physical memory.

While the array virtual address 112 is depicted as having the succession of sub-array identification fields 123(k) in the sub-array pointer field 121 and the succession of offset fields 124(k) in the sub-array offset field 122 in the same order as the displacement fields 113(k) in the input address 110, it will be appreciated that the orders of the fields 123(k) and 124(k) in the respective fields 121 and 122 of the array virtual address 112 may differ from the order of the displacement fields 113(k) in the input address. However, if the swapper/combiner 130 maintains the order of at least the sub-array identification field 115(N), immediately following the array base address pointer 114, in formation of the array virtual address 112, as shown in FIG. 5, and if the size of the field 115(N) is of predetermined size, or at least predetermined minimum size, it will be appreciated that the contents of the sub-array identification field 115(N), at least to the extent of the predetermined size, need not be transmitted to the swapper combiner, but instead may, with the array base address pointer, be copied directly into field 123(N).

The virtual memory management arrangement reduces the memory requirements for a lookup table by increasing the likelihood that the lookup table entries for a sub-array of the function's domain are stored in the same page of memory. If the function is evaluated for a plurality of points in a sub-array of the domain, all corresponding lookup table entries will be stored in the same page of memory. If the page containing the lookup table entries is mapped to the zero page, only one new page need be allocated for storage of the function value.

Additions, subtractions, deletions and other modifications of the preferred particular embodiment of the inventors will be apparent to those practiced in the art and are within the scope of the following claims.

What is claimed is:

1. An apparatus for building and accessing a table storing an evaluated function value for each of a plurality of points in a domain of a function, comprising:
    (1) means for generating an input address which identifies a selected domain point,
    (2) a memory device for providing a lookup table entry value in response to said input address, said memory device comprising:
        a page table storage means for mapping the input address to a storage location, wherein the input address is initially unallocated and mapped to a first default storage location shared with other input addresses and containing a default value, and wherein the input address is subsequently allocated and mapped to a corresponding second storage location allocated to said input address,
    (3) means for determining whether said input address is allocated based on the entry table value provided in response to the input address,
    (4) means for determining the value of said function at said selected domain point when the input address is unallocated, and
    (5) means for storing said determined function value in a storage location allocated to said input address, said means for storing comprising:
        means for modifying said page table storage means to map said input address to said allocated storage location.

2. The apparatus of claim 1 wherein said page table storage means comprises a page pointer storage location for storing a page pointer for a page of input addresses, wherein a page pointer is initially a default pointer which identifies a first page of storage locations shared by multiple input addresses, and wherein said page pointer subsequently identifies a second allocated page of storage locations allocated to input addresses within said page of input addresses.

3. The apparatus of claim 2 wherein said means for modifying said page table comprises means for replacing a default page pointer with a new page pointer identifying a set of storage locations allocated to input addresses with said page.

4. The apparatus of claim 3 further comprising initializing means for initializing each storage location within said allocated page to said default value.

5. The apparatus of claim 4 wherein said initializing means comprises means for copying a default page identified by said default page pointer.

6. The apparatus of claim 3 wherein said page pointer storage location comprises a page number storage portion for storing a page number identifying a set of storage locations and an attribute storage portion for storing an attribute identifier which specifies storage location access attributes.

7. The apparatus of claim 1 wherein said input address includes a sequence of dimensional pointers which identify said input point in a multidimensional domain, and wherein said memory device further comprises:
    means for deriving a first pointer which identifies a multidimensional sub-array of domain points which includes said input point, and
    means for deriving a second pointer which identifies said input point in said multidimensional sub-array of points.

8. A method for building and accessing a table storing an evaluated function value for each of a plurality of points in a domain of a function comprising the steps of:
    generating an input address which identifies a selected domain point,
    mapping the input address to a corresponding storage location in a memory device, wherein the input address is initially unallocated and mapped to a default storage location shared with other input addresses and containing a default lookup table value, and wherein the input address is subsequently allocated and mapped to a corresponding storage location allocated to said input address,
    determining whether said input address is allocated based on the entry table value provided in response to the input address,
    determining the value of said function at said selected domain point when the input address is unallocated,
    storing said determined function value in a storage location allocated to said input address, and
    remapping said input address to said allocated storage location.

9. The method of claim 8 wherein said mapping step comprises the step of:
    storing a page pointer for a page of input addresses, wherein said page pointer is initially a default pointer which identifies a page of storage locations shared by multiple input addresses and wherein said page pointer subsequently identifies a set of storage locations allocated to said input addresses within said page.

10. The method of claim 9 wherein said remapping step comprises the step of replacing the default page pointer with a new page pointer identifying a set of storage locations allocated to said input addresses.

11. The method of claim 10 further comprising the step of initializing each storage location of said set of storage locations to said default value.

12. The method of claim 11 wherein said initializing step comprises the step of copying a default page identified by said default page pointer.

13. The method of claim 12 wherein storing said page pointer comprises the steps of:

storing a page number identifying a set of storage locations and storing an attribute identifier which specifies storage location attributes.

14. A method for dynamically allocating storage memory for storing a plurality of function values, each stored function value representing a value of a function evaluated at a selected domain point of the function's domain, the method comprising the steps of:

generating an input address representative of a selected domain point, selecting, from a page table storage means, a page pointer which indicated whether said input address is allocated, selecting, if said input address is unallocated, a new portion of said memory, said new portion comprising a new storage location allocated to said input address, evaluating the function at the selected domain point, and storing in said new storage location, the function value evaluated at the selected domain point identified by said input address.

15. The method of claim 14 further comprising the step of:

determining if said selected page pointer includes a default page number identifying a default physical page of storage locations in said memory.

16. The method of claim 15 wherein said step of determining if said selected page pointer includes a default page number comprises the step of determining whether said default physical page contains at least one storage location containing a default value which indicates that the function value is unknown for all points whose input addresses are unallocated.

17. The method of claim 15 wherein said step of selecting a new portion of memory comprises the step of replacing said default page number of said page pointer with a physical page number identifying a new physical page of storage locations in said memory.

18. The method of claim 14 wherein said input address includes a sequence of dimensional pointers which identify said input point in a multidimensional domain, and wherein said step of determining if said memory contains a storage location allocated to said input address comprises the steps of:

deriving from a higher order portion of each said dimensional pointer, a first pointer which identifies a multidimensional sub-array of domain points which includes said input point, and deriving from a lower portion of each said dimensional pointer, a second pointer which identifies said input point in said multidimensional sub-array of points.

19. The method of claim 18 wherein deriving said first pointer comprises the step of:

concatenating said higher order portions of each dimensional pointer to form said first pointer; and wherein deriving said second pointer comprises the steps of:

concatenating said lower portions of said dimensional pointer to form said second pointer.

20. The method of claim 19 further comprising the steps of:

selecting dimensionality indicia defining demarcations, within a input address, between the respective dimensional pointers and using the dimensionality indicia to identify the dimensional pointers within the input address.

21. A method for evaluating a function comprising the steps of:

generating an input address representation of the function input value, searching a stored lookup table, based on the address representation, for the corresponding function value, determining the function value explicitly if a default value is stored in the lookup table, storing the determined function value at the corresponding address representation, said storing step comprising:

determining if said input address is allocated, selecting, if said input address is unallocated, a newly allocated storage location allocated to said input address, and remapping said input address to said newly allocated storage location.

22. A method for building and accessing a function table which stores function values in function table addresses that correspond to points in the function's input domain, the method comprising steps of:

initializing a page table to map input domain points to a shared region of the function table where a default value is stored as a function value;

selecting a domain point in the function's input domain;

mapping the domain point to a function table address;

reading a function value stored in the function table address;

if the function value is the default value then (1) evaluating the function for the input domain point, (2) storing the evaluated function value in a non-shared function table address, and (3) modifying the page table to map the domain point to the non-shared function table address in which the output value is stored.

* * * * *